Figure 1:
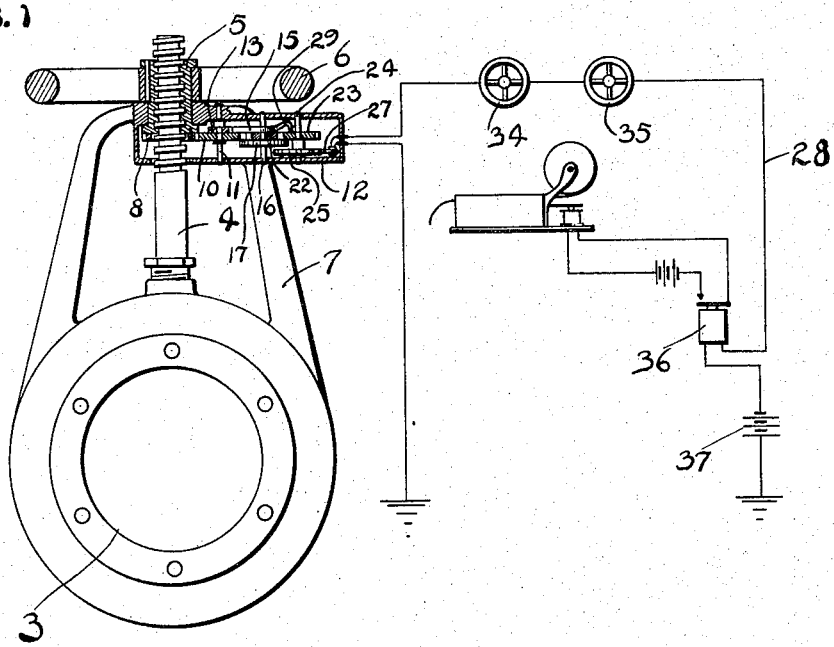

J. D. NELSON.
ALARM DEVICE FOR VALVES.
APPLICATION FILED FEB. 9, 1911.

1,166,624.

Patented Jan. 4, 1916.

Witnesses

Inventor
James D. Nelson
By Walter P. Murray
Attorney

UNITED STATES PATENT OFFICE.

JAMES D. NELSON, OF CINCINNATI, OHIO.

ALARM DEVICE FOR VALVES.

1,166,624.  Specification of Letters Patent.  Patented Jan. 4, 1916.

Application filed February 9, 1911.  Serial No. 607,537.

*To all whom it may concern:*

Be it known that I, JAMES D. NELSON, a citizen of the United States of America, and resident of Cincinnati, county of Hamilton, and State of Ohio, have invented certain new and useful Improvements in Alarm Devices for Valves, of which the following is a specification.

This invention relates to alarm apparatus and has for an object to produce a simple and effective alarm device for use in connection with the valves of a fire service distribution system.

A further object is to produce an alarm device for use in connection with valves, which will transmit an alarm signal, when the valve to which it is applied is moved from the normally wide open position to a closed or partially closed position, and which will transmit an all right signal, when the valve is returned from the closed or partially closed position to the wide open position.

A further object is to produce an alarm device for use in connection with fire service distribution systems, which is capable of transmitting distinguishable alarm and all right signals, so that more than one of such devices may be employed in the same circuit, and be capable of indicating the valve which has been tampered with.

These and other objects I attain by means of a device embodying the features herein described, and illustrated in the drawings accompanying and forming a part of this application.

Figure 2:
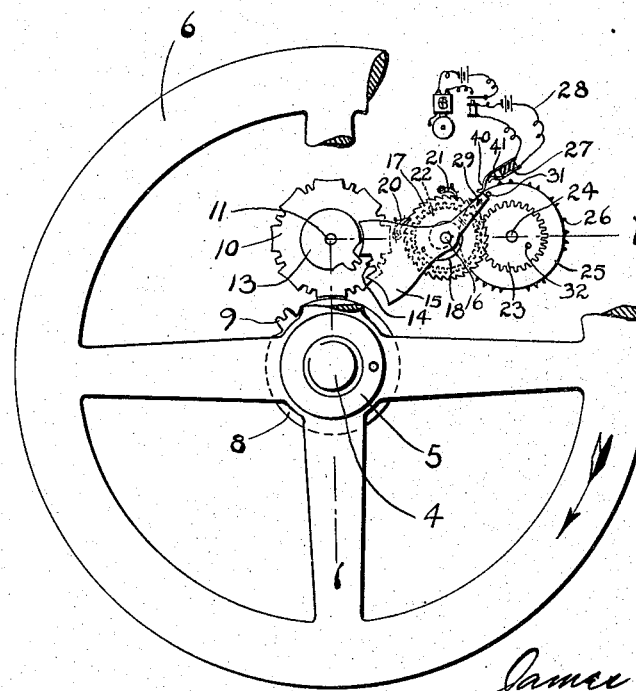

In the drawings, Figure 1 is a partial side elevation and partial sectional view along the line 1—1 of Fig 2, and illustrates a valve equipped with an embodiment of my invention, which is shown in connection with a diagrammatically illustrated alarm circuit. Fig. 2 is a plan view on an enlarged scale of the alarm device shown in Fig. 1, with the protective casing removed, and shown in connection with a fragmental plan view of the valve operating wheel and a diagrammatic illustration of an alarm circuit.

Referring to the drawings: The illustrated embodiment of my invention is shown in connection with a gate valve 3, in which the stem 4 is screw threaded and extends through an internally threaded collar 5, to which the hand wheel 6 of the valve is secured. The collar 5 is rotatively mounted in a bearing provided in brackets 7, which are formed integrally with the valve casing. The valve stem 4 moves through the collar 5, when the wheel 6 is turned, and in this manner opens and closes the valve 3. A wheel 8 is rigidly mounted on the inner or lower end of the collar 5, so that it rotates with the collar, when the wheel 6 is turned.

The wheel 8 illustrated is provided with two teeth 9, which mesh with the teeth of a mutilated gear 10, rigidly mounted on a shaft 11, which is journaled in the protective casing 12 of the alarm device. An intermittent gear 13 is rigidly mounted on the shaft 11, and is shown provided with two teeth, which are adapted to mesh with a tooth 14 provided on a segment 15, which is pivotally mounted on a shaft 16, journaled in the casing 12. A ratchet wheel 17 is rotatively mounted on the shaft 16, and one end of a coiled spring 18, which surrounds the shaft 16, is secured to it. The other end of the spring 18 is secured to the shaft 16, so that the spring will be wound up around the shaft, when the ratchet wheel is turned relatively to the shaft.

The intermittent gears 8, 10 and 13 are so arranged that one revolution of the wheel 6, in moving the valve 3 from the full open to a partially closed position, will shift the segment 15 from a normal to an alarm position. The segment carries a pawl 20, which is held in engagement with the teeth of the ratchet wheel 17, and which moves the wheel to wind up the spring 18, when the segment is moved from the normal to the alarm position. A pawl 21, mounted on the casing 12, engages the teeth of the ratchet wheel, and is adapted to hold the wheel in the position to which it is moved by the pawl 20.

A gear wheel 22 is rigidly mounted on the shaft 16 and meshes with a gear wheel 23, which is mounted on a shaft 24, journaled in the casing, and on which a signal wheel 25 is rigidly mounted. The signal wheel 25 is provided with stops 26, which are located around the periphery of the wheel and are adapted to engage and actuate a circuit breaker 27, as the wheel 25 rotates. The stops 26 are arranged in groups, so that they are capable of actuating the circuit breaker to transmit distinguishable signals. The circuit breaker is located in an alarm circuit 28. The wheel 25 is held in the normal position by an arm 29, which is provided on the segment 15 and engages a pin 31, carried by the wheel 25. The arm is so arranged that it stands in the path of travel of the pin 31, when the segment is located in the normal position. The first closing revolution of the wheel 6 advances the intermittent gear 10 one notch, and moves the segment 15 from the normal position to the alarm position. This motion advances the ratchet wheel 17, winds up the spring 18 and releases the pin 31, so that the signal wheel 25 is turned by the power of the spring 18 through a portion of a revolution, and so that it actuates the circuit breaker 27 to transmit over the alarm circuit a distinctive signal, such, for example, as "2—2—2—4." The wheel is stopped in this motion by a pin 32, carried by the gear wheel 23, and so located that it moves into contact with the arm 29, when the segment, and consequently the arm, are moved to the abnormal position. The teeth of the intermittent gear 10 are so arranged, that the valve 3 may be fully closed, without moving the teeth of the intermittent gear 13 into engagement with the segment 15 a second time. With this arrangement, the last opening movement of the wheel 6, will cause the intermittent gear 13 to engage the segment 15 on the return movement of the gear 13, and the segment will be moved by the gear from the alarm to the normal position. This movement of the segment will release the pin 32 by moving the arm 29 out of the path of its travel, and, consequently, the wheel 25 will be turned by the spring 18 through the remainder of one revolution, or until it is stopped by the engagement of the pin 31 with the arm 29. The stops 26 are so arranged that the circuit breaker will be actuated to send in a distinctive all right signal during the later motion of the wheel, such, for example, as "3—4."

In Fig. 1, I have shown the circuit breaker 27 located in a diagrammatically illustrated alarm circuit 28, which includes two other alarm devices, diagrammatically illustrated at 34 and 35, a relay 36, and a source of current 37. The relay is arranged to operate a recording device of ordinary construction. The stops on the signal wheels 25 of each device in the same circuit may be so arranged, that each device will transmit a distinctive signal, after the alarm and all right signals have been transmitted, and in this manner indicate which device in the circuit is in operation. Any convenient form of circuit breaker may be employed; the one illustrated consists of two spring arms 40 and 41, mounted on opposite sides of an insulating block and electrically connected into the alarm circuit. The free ends of the arms contact with each other and the outer free end of the arm 40 contacts with the periphery of the wheel 25, and is actuated by the stops on the wheel 25, to move away from the arm 41 and break the alarm circuit.

In Fig. 2, I have illustrated a simple form of alarm circuit, which is adapted to ring an alarm bell. The casing 12 completely incloses the alarm device, and it will be apparent that the alarm device may be mounted on any convenient part of the casing of the valve 3, and that the device may be employed with any type of valve. Any of the numerous well-known means for protecting the alarm circuit may be employed.

What I claim is:—

1. In combination with a valve, an alarm mechanism comprising a make and break device located in an alarm circuit, a signal wheel provided with stops for actuating said device, a clock mechanism for actuating said wheel, a segment movable from a normal to an alarm position for winding said clock mechanism and controlling the operation of said wheel, and means actuated by said valve for moving said segment on the first closing motion of the valve to wind said clock and to cause said wheel to actuate said device to transmit an alarm, and for moving the segment on the last opening motion of the valve from said alarm position to the normal position, and causing said device to be actuated by said wheel to transmit an all right signal.

2. In combination with a valve, an alarm mechanism comprising a make and break device, an alarm circuit in which said device is located, a signal wheel provided with two sets of stops for engaging said device and thereby transmitting distinctive signals, a clock mechanism for actuating said wheel, means actuated by the valve for winding the clock mechanism and for controlling the operation of the wheel whereby one set of stops engages the make and break device when the valve is closed and the other set engages it when the valve is open.

3. In combination with a valve, an alarm mechanism comprising a make and break device, an alarm circuit including said device, a signal wheel provided with two sets of stops for engaging said device, and a segment actuated by the valve for controlling the operation of the wheel whereby one set or the other of the stops on the wheel engage the make and break device when the valve is moved.

4. In combination with a valve, an alarm mechanism comprising a make and break device, an alarm circuit including said device, a signal wheel provided with two sets of signal stops for engaging the device, a clock mechanism for actuating the wheel, a segment movable from a normal to an abnormal position for winding the clock mechanism and sending an alarm signal and movable from the alarm position to the normal position for sending all right signals, a stop carried by the wheel for engaging the segment when it is in the normal position, a second stop carried by the wheel for engaging the segment when it is in the alarm position, said stops being so located with relation to the signal stops that said wheel moves to transmit a distinctive signal when each stop is released from the segment, and means actuated by the valve for actuating the segment.

JAMES D. NELSON.

Witnesses:
E. W. McCallister,
B. R. Kropf.